United States Patent

[11] 3,586,047

| [72] | Inventor | Kurt Ehrenberg<br>Munchner Strasse 4, Dietzenbach,<br>Germany |
|---|---|---|
| [21] | Appl. No. | 762,222 |
| [22] | Filed | Sept. 18, 1968 |
| [45] | Patented | June 22, 1971 |
| [32] | Priority | Sept. 19, 1967 |
| [33] | | Germany |
| [31] | | H63923XII |

[54] DETACHABLE COUPLING
15 Claims, 9 Drawing Figs.

[52] U.S. Cl. .................................................... 137/614.04,
  137/543.17, 137/540
[51] Int. Cl. ..................................................... F16l 37/22,
  F16l 37/28
[50] Field of Search ............................................. 137/614.04,
  543.17, 539.5, 540, 543.13, 543.21, 537

[56] References Cited
UNITED STATES PATENTS

| 2,481,713 | 9/1949 | Bertea | 137/539.5 |
|---|---|---|---|
| 2,548,528 | 4/1951 | Hansen | 137/614.04 |
| 2,673,062 | 3/1954 | Cornelius | 137/540 |
| 2,735,696 | 2/1956 | Omon | 137/540 |
| 3,196,897 | 7/1965 | Hodson | 137/614.04 |
| 3,460,801 | 8/1969 | Norton | 137/543.17 |

*Primary Examiner*—William F. O'Dea
*Assistant Examiner*—William H. Wright
*Attorney*—Richard G. Stephens ABSTRACT: A two-piece detachable hose coupling in which each coupling half comprises a cylindrical sleeve having a valve seat and a floating movable valve plug or body adapted to be urged against the seat by one or more coil springs, the coil spring or springs being connected to the valve body by means of thin plate pieces which do not appreciably reduce the cross-sectional area through which fluid may flow through the sleeve.

DETACHABLE COUPLING

This invention relates to a detachable coupling, preferably for the connection of hoses. It consists of a female receptacle and a cooperating male portion, each of which contains a spring-loaded valve plug.

Couplings of this kind are used, e.g. to connect hoses which contain gaseous or liquid media. They also can be used to connect hoses to gages or other connections. The fluid may be moved through the couplings either with or without pressure.

Typical couplings of the prior art include a movable valve plug or valve within the coupling which is urged by a valve spring toward a valve seat and which is guided toward the valve seat by a special guide piece, so that the valve or valve body is always properly located on the valve seat when the coupling is opened, i.e. when the two parts of the two-piece coupling are detached from each other. With such an arrangement a special guide must be provided and fitted within the parts of the coupling. Also, the guide piece situated within known coupling halves uses up a considerable portion of the otherwise-available flow area, so that the resulting loss of flow area becomes an important consideration in all designs of such couplings. Further, large length dimensions of the prior valve plugs have made the lengths of such couplings relatively great.

The present invention was made with the aim of providing couplings which have a small loss of flow area, and which also may be built with simpler elements than those previously used. It was found that the mentioned problems of the prior couplings can be solved easily if the valve plugs are designed to be floating, and if the valve springs are arranged to hold the plugs as well as to guide them.

In this way, according to the invention, movable valve plug bodies can be made simpler and shorter than those previously known, and made so that they do not interfere with as much of the flow area as prior valve plug bodies do.

Furthermore, guidance parts within the coupling which reduce the flow area become unnecessary, and through use of the present invention, a relatively great space is available behind the valve plug bodies within the coupling, for the fluid media. Also, the complicated insertion of guidance parts inside the two halves of a two-piece coupling is not required.

More specifically, the new movable valve plug body or valve has a short extension portion which extends rearwardly into the coupling piece and which has a recessed area which receives a flat plate piece which attaches to a spring. In one illustrated embodiment of the invention the valve spring is shown as a coil spring having one end which fits on the rear edges of the spring receiver piece and another end which is secured within the half of the two-piece coupling. The helical valve spring is made large enough in diameter that it touches the inside wall of the sleeve of the coupling in which it is installed, and so that it has an inside diameter which is greater than the outside diameter of the movable valve plug or valve body which it acts against.

In this embodiment of the invention reduction in the flow area in the coupling half is caused only by the quite flat spring receiver piece situated in the rear area of the tapered extension of the movable valve plug or valve body. The valve spring itself does not appreciably interfere with any portion of the flow area, and it serves the valve plug body as a guide for longitudinal movement as well as serving as a valve spring. In a modified form of the invention one may provide angularly offset slots in the extension of the valve plug body in order to receive flat spring receiver plates. In another example of the invention the valve plug body includes a short rearward extension which tapers into the coupling half and which provides a longitudinal recess to accept the valve spring, which is made as a coil spring.

For the purpose of fixing the valve spring in the coupling piece or sleeve, a resilient spring-receiver piece is provided, the spring-receiver piece having an attachment which is inserted into the rear end of the valve spring, the front end of which spring extends to and presses against the valve body. The resilient spring-receiver piece includes S-shaped holding or clamping arms which are inserted in corresponding notches or recesses in the inner wall of the coupling sleeve. In this model of the invention also, the valve spring serves simultaneously as a guide for longitudinal movement of the valve body. The loss of flow area again is considerably smaller than with previously known coupling elements.

Additionally, small guidance attachments may be provided on the rearward extension of the valve body which tapers rearwardly into the coupling sleeve. These guidance attachments insure completely straight guidance of the valve body relative to the valve seat.

Of special advantage is that initial tension is used to screw the valve springs onto the spring receiver parts, which are oversize relative to the spring diameters or pitches, with the result that the valve body and the valve spring are both fixedly secured against slippage and loosening.

In another model of this invention the valve body includes a small extension which tapers rearwardly into the coupling sleeve. Spring holders are provided on the rearward extension to receive several helical valve springs. A spring clip or spring expansion ring inserted into a groove in the inner wall of the coupling sleeve serves as a rear stop for the valve springs.

Further characteristics and details of the invention are disclosed in the following description of several embodiments and in the drawings, wherein:

FIG. 1 illustrates one form of the invention in a form of exploded view, together with portions of a previously known hose coupling.

Figure 1:
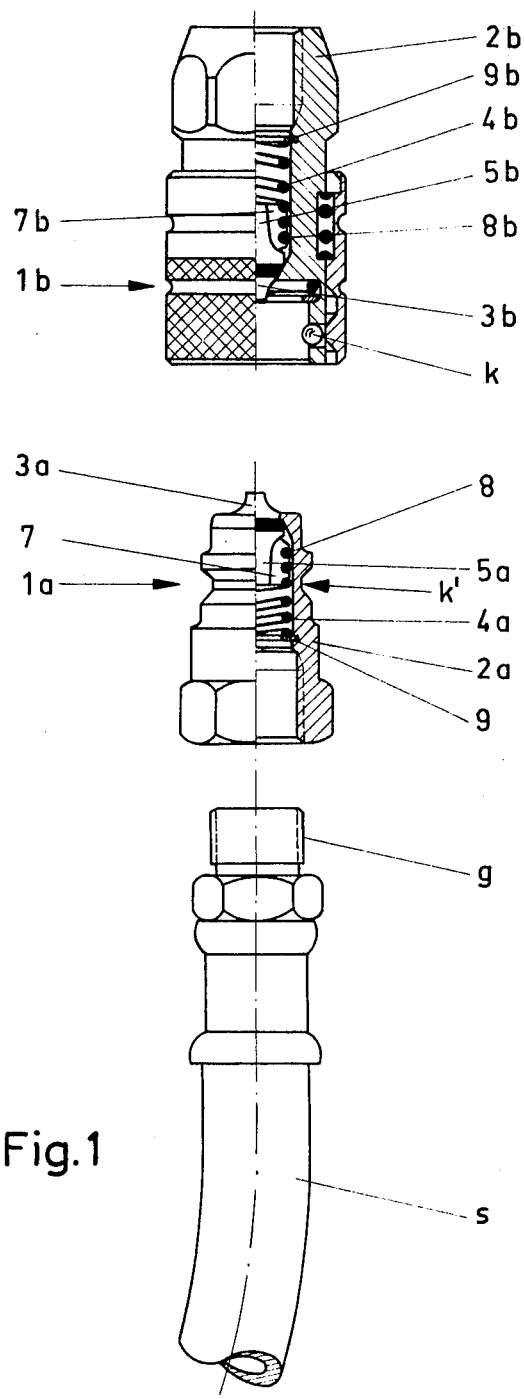
FIG. 1 is an exploded view of one embodiment of a two-piece detachable coupling constructed in accordance with the invention, with certain portions of the two-piece coupling shown in cross section.

A first half of a two-piece detachable coupling is shown as a male coupling piece 1a to which a hose S is attachable by means of a threaded connector G, and coupling piece 1a is adapted to be inserted into the other half of the two-piece coupling, which is shown as comprising a female receptacle coupling piece 1b. Movable valve plugs or bodies 3a and 3b will be seen to be forced off of their seats against the forces of their respective valve springs 4a and 4b when pieces 1a and 1b are completely coupled together, thereby allowing free flow of fluid between male coupling piece 1a and female coupling piece 1b. Upon disconnection of the valve plugs 3a and 3b are urged by the forces of their respective valve springs 4a and 4b against their corresponding seats, thereby preventing any fluid flow out of either half of the coupling. A hose can be connected to the upper end of female receptacle 1b, or receptacle 1b may be designed as a wall receptacle or the like. In the coupled condition, the balls K of female receptacle coupling piece 1b engage circular groove K' of male plug 1a. Male plug piece 1a and/or female receptacle 1b are sometimes provided with known types of holding elements and safety elements (not shown) which prevent the separation of the two halves of the coupling.

In FIG. 1 it will be seen that the elements 2a, 3a, 4a, 5a, 7, 8 and 9 of the first part 1a of the coupling correspond to elements 2b, 3b, 4b, 5b, 7b, 8b and 9b of the second part of the coupling, 1b. Without changing the basis of the invention both plug 1a and receptacle 1b can have any desired outside outline or configuration.

Figures 2, 3:
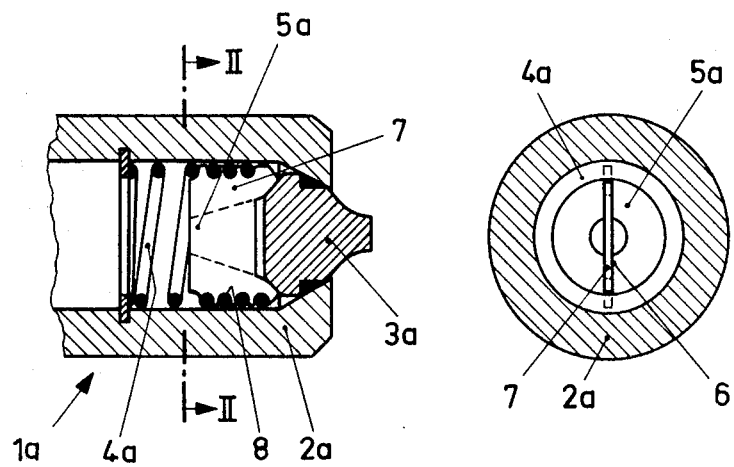
FIG. 2 is a cross sectional view showing one piece, or one half of the two-piece coupling of FIG. 1.
FIG. 3 is a cross-sectional view taken along line II–II of FIG. 2.

FIG. 2 shows a cross-sectional view of the coupling piece which is generally denoted 1a in FIG. 1. Within the outer shell or sleeve 2a of the coupling, valve plug or valve body 3a is floatingly arranged to be guided by, as well as to be held by, valve spring 4a. More specifically, valve body 3a includes a short tapered extension 5a which extends rearwardly into sleeve 2a of the coupling.

As can be seen in FIG. 3, a cross slot 6 formed in extension 5a receives a flat spring-receiver plate 7. FIG. 1 shows that the inner edges of the flat spring receiver plate 7 facing valve body 5a conform to the tapered outline valve body 5a. FIG. 3 shows that the spring receiver plate 7 is extremely narrow and thin compared to the diameter of the valve plug or body 3a. As shown in FIGS. 1 and 2 the outer edges of the spring receiver plate 7 have grooves 8 which are engaged by the turns of helical coil spring 4a. The other end or rear end of valve spring 4a is located within the sleeve 2a of the coupling piece and secured therein in this embodiment by a spring clip 9.

Figures 4, 5:
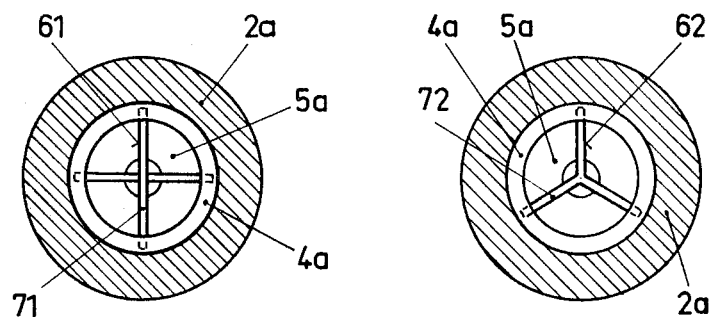
FIG. 4 is a cross-sectional view similar to that of FIG. 3 illustrating one possible modification of the embodiment of FIG. 1.
FIG. 5 is a cross-sectional view similar to those of FIGS. 3 and 4 illustrating another possible modification of the embodiment of FIG. 1.

FIGS. 3 and 4 show modifications of the just-described model of the invention. According to FIG. 4 two perpendicularly arranged slots 61, 61 are arranged in the rear extension 5a of valve plug 3a in order to receive flat spring receiver plates 71, 71. The spring receiver plates 71, 71 are also extremely thin. In the spring receiver plate 71 shown in FIG. 4, the outer edges of the spring receiver pieces 71 also include grooves to engage turns of a helical valve spring. In FIG. 5 the slots 62 in the rearward extension 5a of the valve plug 3a have been arranged at 120° to each other. Here the spring receiver pieces 72 provided again include grooves or notches at their outer edges to engage the turns of a helical valve spring.

In the examples of FIGS. 1 to 4 the valve spring is made as a coil spring 4a having one end which seats on spring receiver pieces (7, 71 or 72) and having its other end seating against spring ring 9 located within the sleeve 2a of the coupling. In particular, FIG. 1 shows that the reduction of flow area caused by the spring receiver parts within the half of the coupling is very small. Valve spring 4a engages the inner wall of piece 2a of the coupling and has an inside diameter which is larger than the outside diameter of valve plug or valve body 3a. Thus, the spring receiver plates 71 and 72 of FIGS. 3 and 4 cause minimum additional reduction of the flat area of the path of flow through the coupling.

Figure 6:
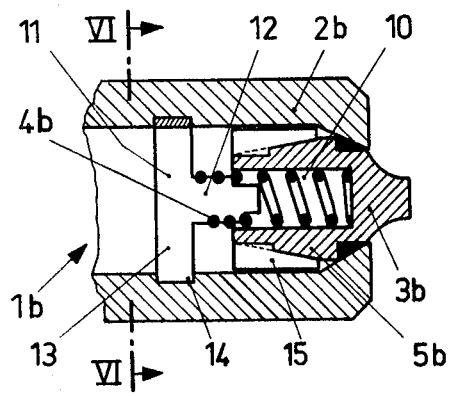
FIG. 6 is a cross-sectional view through one coupling half of another embodiment of the invention.

FIG. 6 shows a further embodiment of the invention. The coupling, generally denoted 1b, includes a sleeve 2b, a valve plug 3b, and valve spring 4b. The valve body 3b again has a short rearwardly-protruding tapered extension 5b which extends into the sleeve 2b of the coupling. Extension 5b has a longitudinal bore 10 which receives one end of valve spring 4b. The longitudinal bore 10 can be drilled into the valve body 3b. In this embodiment the valve spring is again made in the form of a coil spring. In order to create a seat for the spring within the sleeve 2b of the coupling, a spring receiver plate 11 is provided which has an arm 12 which is inserted into the rear end of valve spring 4b.

Figure 7:
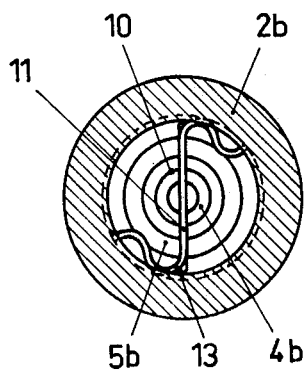
FIG. 7 is a cross-sectional view taken along lines VI–VI of FIG. 6.

FIG. 7 shows that the spring receiver piece 11 has several S-shaped clamping arms 13, 13 which seat in a cylindrical groove 14 in the inner wall of sleeve 2b. In order to achieve guidance of the valve body 3b one may provide narrow guidance arms 15 at the rearwardly tapering portion 5b. The outer edges of these narrow guidance attachments 15 engage the inner wall of sleeve 2b.

The reduction of flow area in the coupling half of the types shown in FIGS. 5 and 6 is again extremely small compared with that of prior couplings. Here also the valve plug or body is held by the valve spring 4b as well as it is guided by it.

In the thus-far described embodiments the valve springs 4a and 4b are screwed onto the spring receiver parts 7, 71, 72 and onto the plug extension 12 under initial tension. The spring receiver pieces 7, 71, 72 and the extension 12 are made oversize for this purpose, compared with the springs 4a, 4b. Thus the springs are secured against falling out or loosening, which otherwise might be caused by vibration, shaking or rotation.

The valve springs may have different winding angles, i.e. different pitch between the turns at different places along their lengths. That portion of any spring 4a, 4b having a large winding angle or large pitch between turns, serves as a spring, whereas that portion having a small winding angle or smaller pitch between turns may be screwed onto the spring receiver plates 7, 71, 72 or onto the plug body extension 12, respectively.

Figure 8:
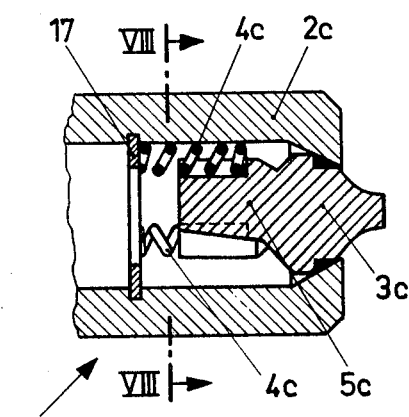
FIG. 8 is a cross-sectional view through one coupling half of a further embodiment of the invention.
Figure 9:
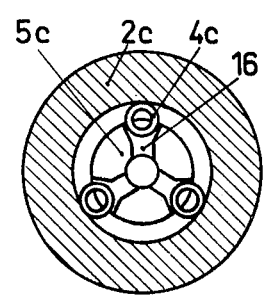
FIG. 9 is a cross-sectional view taken along lines VIII–VIII of FIG. 8.

FIGS. 8 and 9 show a further embodiment of the invention. A coupling half or piece generally denoted 1c includes a sleeve 2c, a valve body 3c and plural valve springs 4c, 3 valve springs 4c being shown. Valve body 3c has a short tapered extension 5c which extends rearwardly into sleeve 2c of the coupling. A spring-holding device 16 is attached to extension 5c to receive the helical valve springs 4c, 4c. A spring expansion ring 17 which is seated in a cylindrical groove the inner wall of sleeve 2c of the coupling serves as a rear abutment or stop for the valve springs 4c, 4c. FIG. 9 shows that the valve springs 4c are offset from each other by 120° and each has only an extremely small diameter compared to the diameter of the valve plug or body. The valve springs 4c lie adjacent the inner wall of sleeve 2c of the coupling. Again, in the last described model, the reduction of flow area caused by the valve body and by the valve spring is smaller than that caused in prior couplings. In FIGS. 8 and 9 valve body 3c again will be seen to be urged toward the valve seat by the valve springs as well as being guided by them.

I claim:

1. A detachable coupling preferably for connection of hoses comprising female and male connector sleeves each including a spring-loaded valve plug, in which each of said valve plugs are floating within their respective connector sleeves and each guided and supported by their respective valve springs, each valve plug including an inwardly tapering extension which extends into its respective connector sleeve, said extension having a perpendicular slot adapted to receive a flat spring-holding piece.

2. A detachable coupling according to claim 1 in which the edge of said spring-holding piece which faces the valve plug includes a recess having edges which conform to and fit against the valve plug.

3. A detachable coupling according to claim 1 in which the outwardly facing edges of said flat spring-holding piece includes grooves to accommodate the turns of a helical valve spring.

4. A detachable coupling according to claim 1 in which said extension includes a pair of mutually perpendicular slots adapted to receive flat spring-holding pieces.

5. A detachable coupling according to claim z in which said extension includes slots which are mutually angularly offset by 120° and adapted to receive flat spring receiver pieces.

6. A detachable coupling according to claim 1 in which each valve plug is spring-loaded by a coil spring which extends between its respective spring-holding piece and a location within its respective sleeve where it is secured to its respective sleeve.

7. A detachable coupling according to claim 6 in which the outer periphery of each coil spring engages the inner wall of the respective sleeve in which it is mounted and in which the inner diameter of each coil spring is greater than the outside diameter of its associated valve plug.

8. A detachable coupling according to claim 1 in which at least one of said valve springs is screwed onto its associated spring-holding piece under initial tension.

9. A detachable coupling according to claim 8 in which at least one of said valve springs has a variable winding pitch between some of its turns, with a portion of said spring having lesser pitch being screwed on an end of its associated spring-holding piece.

10. A detachable coupling half adapted to mate with a similar coupling half to connect a pair of fluid conduits, comprising, a hollow sleeve member having a valve seat; a movable valve plug member extending into said sleeve member; and valve plug translating and guiding means acting between said sleeve member and said valve plug member for urging said valve plug toward said valve seat and for aligning said plug within said hollow sleeve member, said translating and guiding means comprising a coil spring and a flat blade means attached to one end of said coil spring, the plane of said flat blade means extending substantially parallel to the axis of said hollow sleeve member so as to provide minimum restriction to fluid flow through said hollow sleeve member.

11. A device according to claim 10 wherein said flat blade includes a pair of edges having notches adapted to receive turns of said coil spring, thereby to align the plane of said flat blade means in the same direction as the axis of said coil spring.

12. A device according to claim 10 wherein said sleeve member includes means against which the other end of said coil spring seats and said one end of said coil spring urges said flat blade means into contact with said valve plug member.

13. A device according to claim 10 wherein said sleeve member includes means for anchoring said flat blade means and the other end of said coil spring extends within a recess in said valve plug member.

14. A device according to claim 13 wherein said means for anchoring said flat blade means comprises a groove in the inner wall of said sleeve member and said flat blade means includes a plurality of spring arms adapted to resiliently seat in said groove.

15. A device according to claim 13 wherein the portion of said movable valve plug member extending into said sleeve member includes an inwardly tapering portion having a plurality of radially extending fins adapted to guide the movement of said plug member within said sleeve member.